(12) United States Patent
Redington

(10) Patent No.: US 11,154,156 B2
(45) Date of Patent: Oct. 26, 2021

(54) PORTABLE SOLVENT INFUSER ASSEMBLY

(71) Applicant: Michael Evans Redington, Pompano Beach, FL (US)

(72) Inventor: Michael Evans Redington, Pompano Beach, FL (US)

(*) Notice: Subject to any disclaimer, the term of this patent is extended or adjusted under 35 U.S.C. 154(b) by 359 days.

(21) Appl. No.: 16/236,278

(22) Filed: Dec. 28, 2018

(65) Prior Publication Data

US 2019/0200800 A1    Jul. 4, 2019

Related U.S. Application Data

(60) Provisional application No. 62/611,253, filed on Dec. 28, 2017.

(51) Int. Cl.
*A47J 31/06* (2006.01)
*A47J 31/00* (2006.01)
*A47J 31/20* (2006.01)

(52) U.S. Cl.
CPC ......... *A47J 31/005* (2013.01); *A47J 31/0636* (2013.01); *A47J 31/20* (2013.01)

(58) Field of Classification Search
CPC ... A47J 31/005; A47J 31/0636; A47J 31/4403
USPC .................... 99/317, 322, 323; 206/0.5, 219
See application file for complete search history.

(56) References Cited

U.S. PATENT DOCUMENTS

| | | | |
|---|---|---|---|
| 2,055,096 A * | 9/1936 | Dehn | C02F 1/003 210/466 |
| 5,318,791 A | 6/1994 | Millman et al. | |
| 6,165,523 A | 12/2000 | Story | |
| 6,797,160 B2 | 9/2004 | Huang | |
| 8,205,542 B2 | 6/2012 | Gilbert | |
| 8,541,039 B2 | 9/2013 | Lackey et al. | |
| 8,613,402 B2 | 12/2013 | Lefkovitz | |
| 2005/0199129 A1 | 9/2005 | Glucksman et al. | |
| 2007/0131120 A1 | 6/2007 | Hubbard | |
| 2010/0108715 A1* | 5/2010 | Santagiuliana | B65D 51/2835 222/81 |
| 2012/0148707 A1 | 6/2012 | Lackey et al. | |
| 2012/0196025 A1 | 8/2012 | Custer et al. | |
| 2012/0234789 A1* | 9/2012 | Mason | B65D 47/36 215/229 |

(Continued)

*Primary Examiner* — Reginald Alexander
(74) *Attorney, Agent, or Firm* — Mark C. Johnson; Johnson Dalal

(57) ABSTRACT

A portable solvent infuser assembly for infusing a drinking liquid dispenser quickly couples and uncouples to a drinking liquid dispenser, yet effectively and efficiently permits infusion of a solute housed in the assembly within a solvent within drinking liquid dispenser. The solvent infuser assembly includes a fine infuser body subassembly and a coarse infuser body subassembly arranged axially, and interchangeable and adaptable to variously sized threaded connections. Apertures define the sidewalls of the infuser body subassemblies to permit liquid inside the drinking liquid dispenser to enter and egress the body cavity. A cap subassembly, which is coupled to the infuser body subassemblies detachably attaches to an opening of the drinking liquid dispenser so that the infuser body subassemblies are fully immersed in the cavity of the drinking liquid dispenser. The cap subassembly has a concave curved shape to enable uniform flowage of the liquid through an infused solution intake member.

20 Claims, 9 Drawing Sheets

(56) References Cited

U.S. PATENT DOCUMENTS

| | | | |
|---|---|---|---|
| 2013/0206717 A1* | 8/2013 | Lane ........................ | A47J 31/18 |
| | | | 215/6 |
| 2014/0044837 A1 | 2/2014 | Weisman et al. | |
| 2014/0224725 A1 | 8/2014 | Uspenski et al. | |
| 2014/0230659 A1* | 8/2014 | Waggoner ............. | A47J 31/005 |
| | | | 99/323 |
| 2015/0230651 A1* | 8/2015 | Molayem ............ | A47J 31/0636 |
| | | | 99/322 |
| 2016/0120355 A1 | 5/2016 | Shen | |
| 2016/0262565 A1 | 9/2016 | Beckman et al. | |
| 2017/0035238 A1 | 2/2017 | Hambly et al. | |
| 2017/0296988 A1* | 10/2017 | Waggoner ............. | B01F 5/0495 |

\* cited by examiner

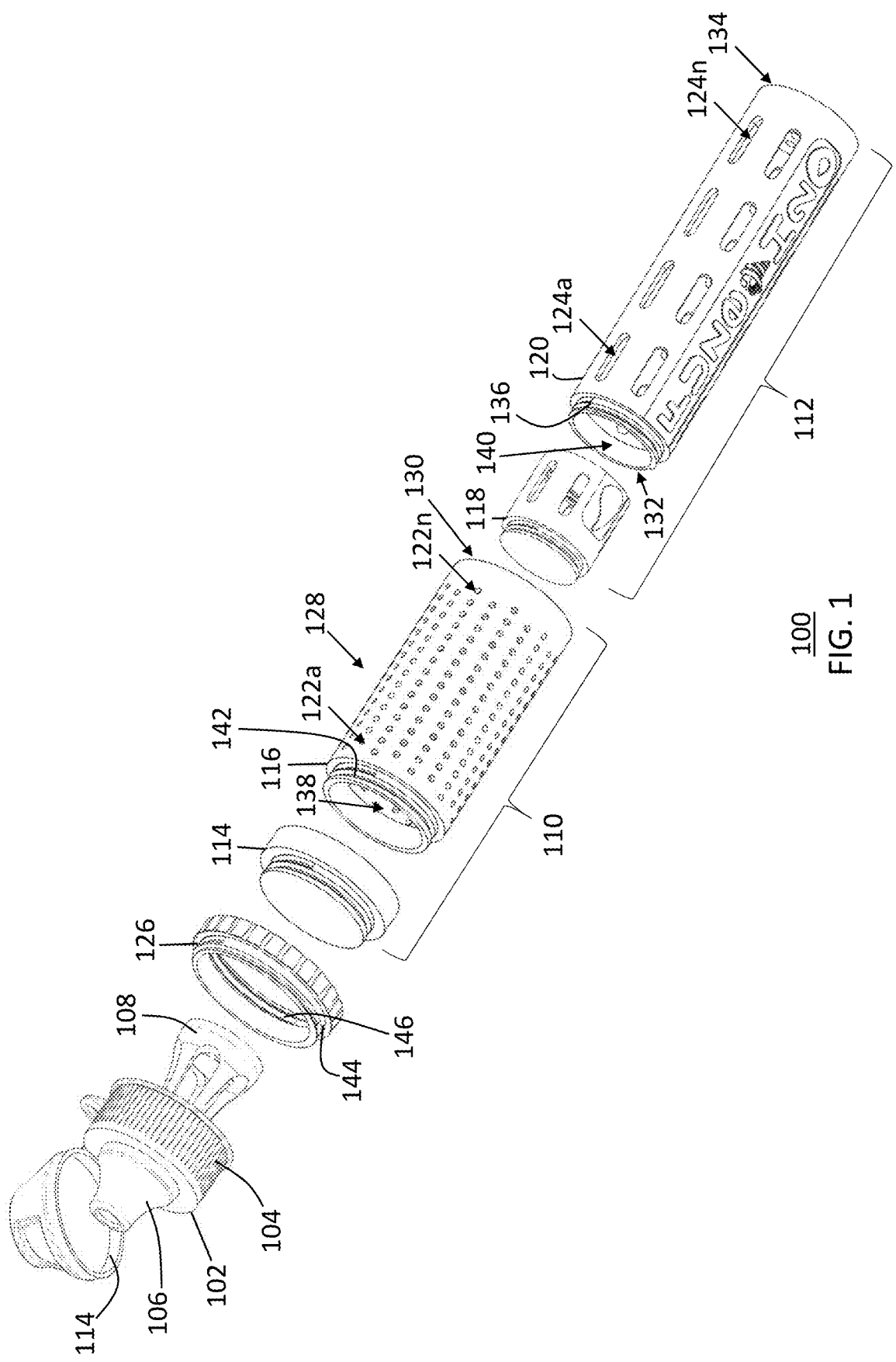

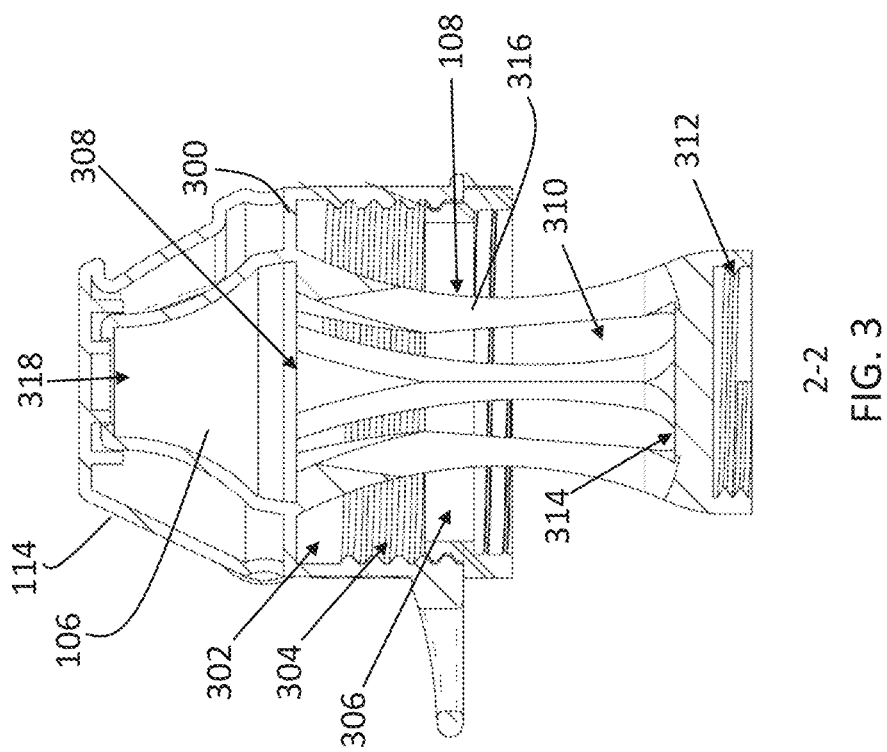
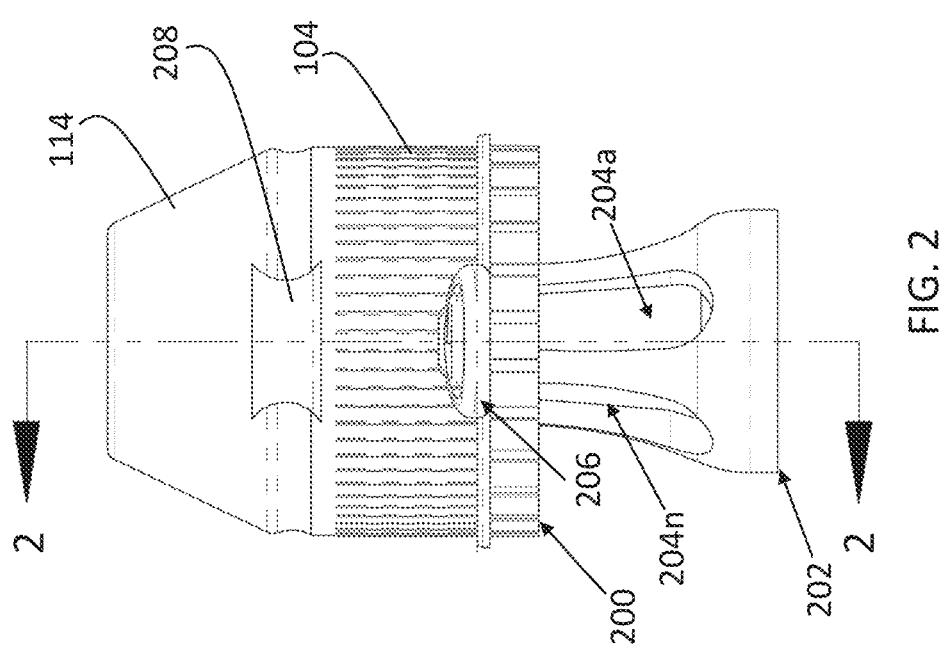

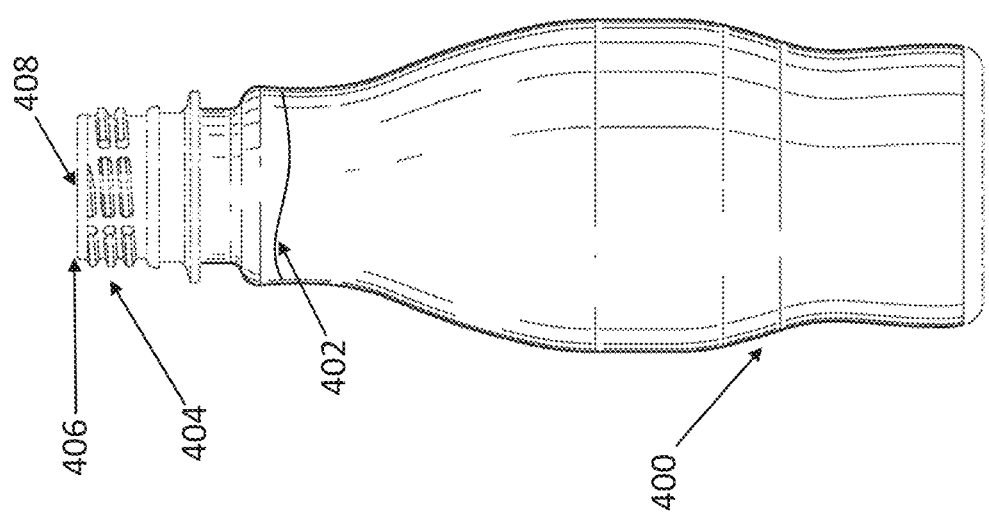

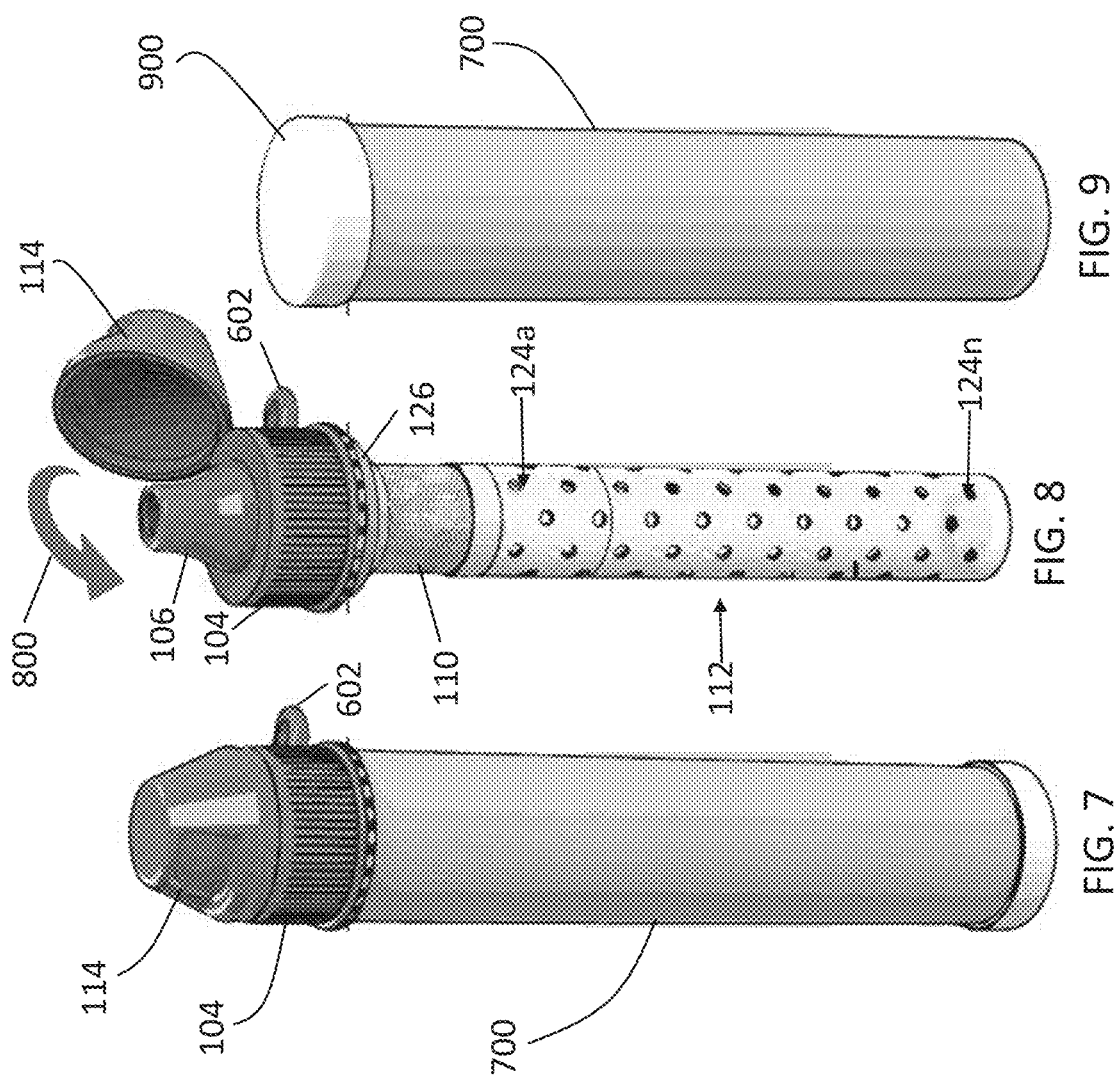

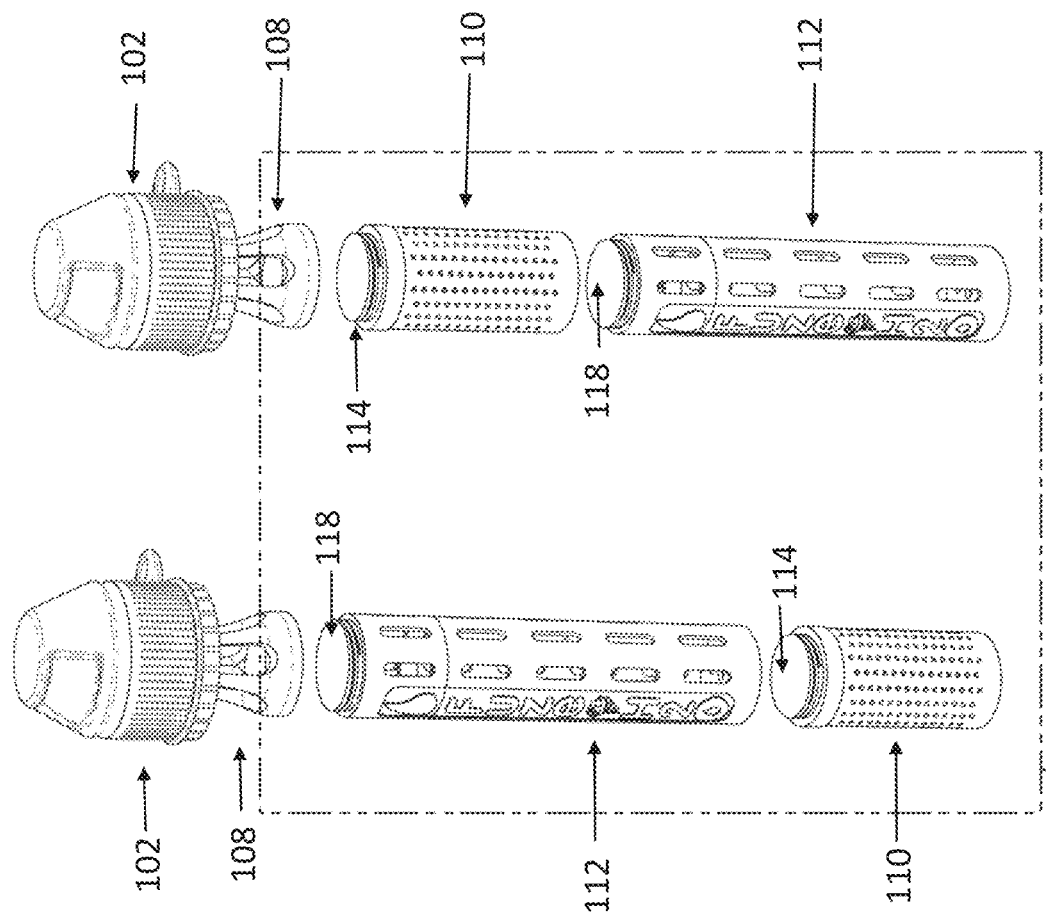

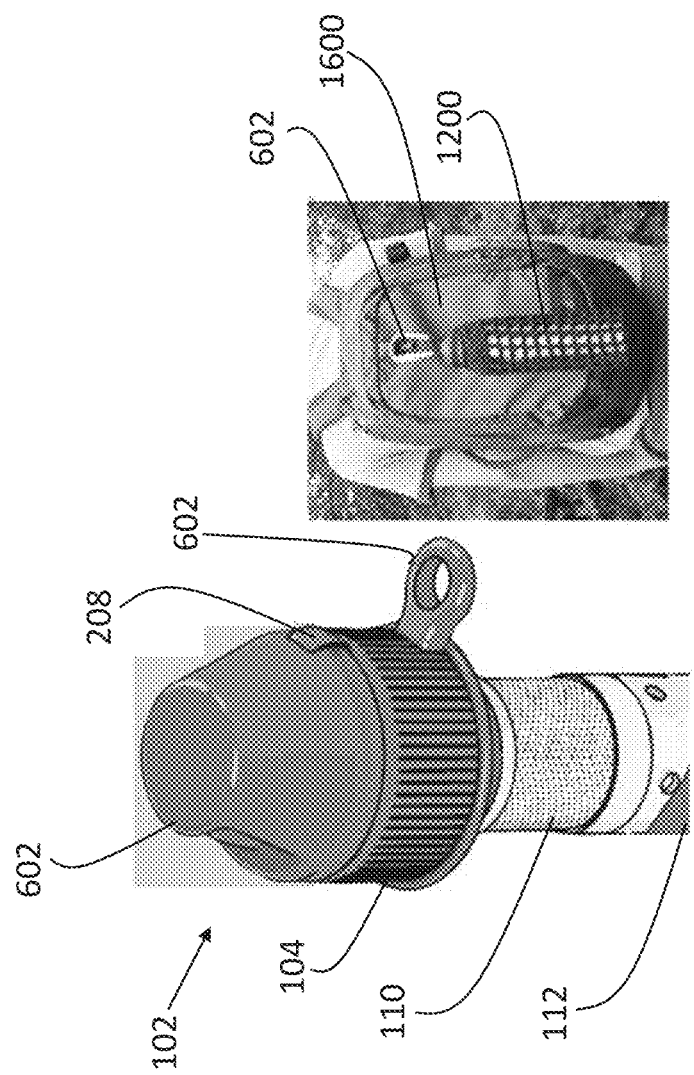

PORTABLE SOLVENT INFUSER ASSEMBLY

CROSS-REFERENCE TO RELATED APPLICATION

This application claims priority to U.S. Provisional Patent Application No. 62/611,253 filed Dec. 28, 2017, the entirety of which is incorporated by reference.

FIELD OF THE INVENTION

The present invention relates generally to solvent infusers, and, more particularly, relates to a selectively removable portable solvent infuser assembly for conventional drinking liquid dispensers.

BACKGROUND OF THE INVENTION

Typically, hydration bottles contain water or other hydrating liquids, and allow users to stay hydrated wherever they go. Hydration bottles allow for easy storage and transportation of various beverages. It is known in the art that many types of drinkable liquids are better enjoyed by infusing the beverage, for example, with fresh fruits or herbs. Also, some drinkable liquids are better enjoyed when chilled.

Typically, the flavoring of a drink with a solute, i.e., fruit, powder, leaf, is done by placing the liquid, often water, into a permeable container, and then inserting the container a liquid that is to be flavored. Bottled water is also perceived as being healthier for the consumer than soda drinks, but the down side to the drinking of simply water as compared to soda drinks or other beverages is that the water can be bland, requiring flavoring to be more enticing.

It is known in the art that infusion devices that can be used with thin-walled water bottles do not always use the same size mouth in their water bottles, and not all manufacturers use the same threads on the screw-on caps of water bottles. A commonly used size is the 28 mm Standard Screw Closure, however other sizes of bottlenecks or mouths are also found in the industry. This can be problematic when the infuser does not have a matching threaded size or shape.

Therefore, a need exists to overcome the problems with the prior art as discussed above.

SUMMARY OF THE INVENTION

The invention provides a portable solvent infuser assembly for infusing a liquid in a drinking liquid dispenser that overcomes the hereinafore-mentioned disadvantages of the heretofore-known devices and methods of this general type and that quickly couples and uncouples to a conventional drinking liquid dispenser, yet effectively and efficiently permits infusion of a solute housed in the assembly within a solvent, e.g., water, within the drinking liquid dispenser. The solvent infuser assembly includes a fine infuser body subassembly and a coarse infuser body subassembly arranged axially, and interchangeable and adaptable to variously sized threaded connections. Apertures are defined on the sidewalls of the fine and coarse infuser body subassemblies to facilitate in permitting water or other liquid inside the drinking liquid dispenser to enter and egress the body cavity.

A cap subassembly, which is coupled to the infuser body subassemblies, is configured to detachably attach to an opening of the drinking liquid dispenser. In this manner, the fine and coarse infuser body subassemblies are fully immersed in the cavity of the drinking liquid dispenser or water bottle. The cap subassembly has a concave curved shape to enable uniform flowage of the liquid through an infused solution intake member.

With the foregoing and other objects in view, there is provided, in accordance with the invention, a solvent infuser assembly that is used in combination with a conventional plastic drinking liquid dispenser. The drinking liquid dispenser is configured to contain a solvent within a dispenser cavity. The drinking liquid dispenser has an upper threaded end with an upper terminal end defining an upper terminal opening in fluid communication with the dispenser cavity.

The solvent infuser assembly includes a cap subassembly that detachably attaches to the upper threaded end of the drinking liquid dispenser. The cap subassembly forms the gateway for accessing the contents of the drinking liquid dispenser. The cap subassembly comprises an inner wall, and an outer sidewall having a lower end and an inner surface with a threaded configuration disposed thereon. The outer sidewall is operably configured to engage with the upper threaded end of the drinking liquid dispenser. The outer sidewall of the cap subassembly defines an enclosed cap cavity.

In some embodiments, the cap subassembly further includes a spout that is coupled to the inner wall of the cap subassembly. The spout defines an enclosed cap channel. Further, the cap subassembly includes an infused solution intake member spanning from the spout. The infused solution intake member extends past the lower end of the outer sidewall, and into the dispenser cavity.

The infused solution intake member has an intake member upper end defining an upper aperture, and defining an infused solution intake channel fluidly coupled to the upper aperture of the infused solution intake member. The infused solution intake member also has an intake member lower end with a threaded configuration defined thereon, and a sidewall separating the intake member upper and lower ends. The sidewall defines a plurality of infusion apertures thereon.

In some embodiments, the solvent infuser assembly further includes a fine infuser body assembly that is operable in the dispenser cavity of the drinking liquid dispenser. The fine infuser body subassembly has an upper end with a threaded configuration disposed thereon. The fine infuser body subassembly is operably configured to engage with the threaded configuration disposed on the lower end of the infused solution intake member.

The lower end opposes the upper end of the fine infuser body subassembly. A sidewall separates the upper and lower ends of the fine infuser body subassembly. The sidewall is defined by a plurality of fine infuser body apertures. The sidewall is also defined by a fine infuser body cavity sized to house a solute therein.

In some embodiments, the solvent infuser assembly further includes a selectively removable fine cover. The fine cover is coupled to at least one of the upper and lower ends of the fine infuser body subassembly. The fine cover restricts passage of solute and solvent between the fine infuser body subassembly, the coarse infuser body subassembly, and the infused solution intake member.

In accordance with another feature, an embodiment of the present invention includes a coarse infuser body subassembly that is operable in the dispenser cavity of the drinking liquid dispenser. The coarse infuser body subassembly has an upper end with a threaded configuration disposed thereon. The coarse infuser body is operably configured to engage with the threaded configuration disposed on the lower end of the infused solution intake member. A lower end opposing the upper end of the fine infuser body subassembly is operably configured to engage with the threaded configuration disposed on the fine infuser body subassembly.

In accordance with another feature, the coarse infuser body subassembly has a sidewall separating the upper and lower ends of the coarse infuser body subassembly. The sidewall is defined by a plurality of coarse infuser body apertures thereon. The sidewall is also defined by a coarse infuser body cavity sized to house a solute therein. The coarse infuser body subassembly is operable in the dispenser cavity of the drinking liquid dispenser.

In accordance with a further feature of the present invention, a selectively removable coarse cover couples to at least one of the upper and lower ends of the coarse infuser body subassembly.

In accordance with a further feature of the present invention, the sidewall of the infused solution intake member has a concave curved shape with respect to the inner surface of the outer sidewall of the cap subassembly.

In accordance with a further feature of the present invention, the infused solution intake member further comprises an intake member lower wall interposed between the lower end of the infused solution intake member and the infused solution intake channel.

In accordance with a further feature of the present invention, the cap subassembly further comprises a cap selectively removably coupled to the cap subassembly and having a closed position along a cap translation path that, with the inner wall of the cap subassembly, encapsulate the spout of the cap subassembly.

In accordance with a further feature of the present invention, the cap is hingedly joined to the outer sidewall of the cap subassembly.

In accordance with a further feature of the present invention, the selectively removable fine cover of the fine infuser body subassembly defines the upper end of the fine infuser body subassembly and is selectively removable to the fine infuser body subassembly with a threaded configuration.

In accordance with a further feature of the present invention, the fine cover and the coarse cover restrict fluid communication between the fine infuser body subassembly, the coarse infuser body subassembly, and the infused solution intake member.

In accordance with a further feature of the present invention, the lower end of the fine infuser body subassembly further comprises a threaded configuration disposed thereon; whereby the upper end of the coarse infuser body with the threaded configuration is operably configured to engage with the threaded configuration disposed on the lower end of the fine infuser body subassembly.

In accordance with a further feature of the present invention, the plurality of coarse infuser body apertures are uniformly greater in diameter than respective diameters of the plurality of fine infuser body apertures.

In accordance with a further feature of the present invention, the solvent infuser assembly comprises a dispenser adapter member of an annular shape. The dispenser adapter member has an upper end with a threaded configuration disposed thereon. The upper end is operably configured to engage with the threaded configuration on the inner surface of the outer sidewall of the cap subassembly.

The dispenser adapter also has a lower end with a threaded configuration disposed thereon. The lower end is operably configured to engage with the threaded configuration on the upper threaded end of the drinking liquid dispenser. The threaded configuration disposed on the lower end of the dispenser adapter is of an annular diameter less than an annular diameter of the threaded configuration disposed on the upper end of the dispenser adapter.

In accordance with a further feature of the present invention, the infused solution intake member further comprises a flange at the intake member upper end.

In accordance with a further feature of the present invention, the flange seats on the upper threaded end of the drinking liquid dispenser.

In accordance with a further feature of the present invention, the solvent infuser assembly comprises a resilient storage case encapsulating the fine infuser body subassembly and the coarse infuser body subassembly.

In accordance with a further feature of the present invention, the solvent infuser assembly comprises a mount ring disposed on the outer sidewall of the cap subassembly.

In accordance with a further feature of the present invention, the threaded configurations of the upper and lower ends of the fine infuser body assembly, the upper and lower ends of the coarse infuser body assembly, and the lower end of the cap subassembly are substantially the same size.

Although the invention is illustrated and described herein as embodied in a solvent infuser assembly for a drinking liquid dispenser, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the infuser body subassemblies.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 1 is an exploded view of an exemplary portable solvent infuser assembly, in accordance with the present invention;

FIG. 2 is a side perspective view of an exemplary cap subassembly, in accordance with the present invention;

FIG. 3 a sectioned side view of the cap subassembly, the section taken along section 2-2 of FIG. 2, detailing an infused solution intake member, in accordance with the present invention;

FIG. 4 is a side perspective view of an exemplary drinkable liquid dispenser, in accordance with the present invention;

FIG. 7 is a perspective view of the assembly encased in a travel case, in accordance with the present invention;

FIG. 8 is a perspective view of the assembly with the travel case removed, in accordance with the present invention;

FIG. 9 is a perspective view of the assembly encased in a travel case and capped with a travel cap, in accordance with the present invention;

FIGS. 10A and 10B are perspective views of the assembly, where FIG. 10A shows the coarse infuser body subassembly arranged above the fine infuser body subassembly, and FIG. 10B shows the fine infuser body subassembly arranged above the coarse infuser body subassembly, in accordance with the present invention;

FIG. 15 is a perspective close-up view of the cap subassembly, showing the mount ring, in accordance with the present invention; and FIG. 16 is a perspective view of the mount ring attached to a mounting surface, in accordance with the present invention.

DETAILED DESCRIPTION

Figure 6:
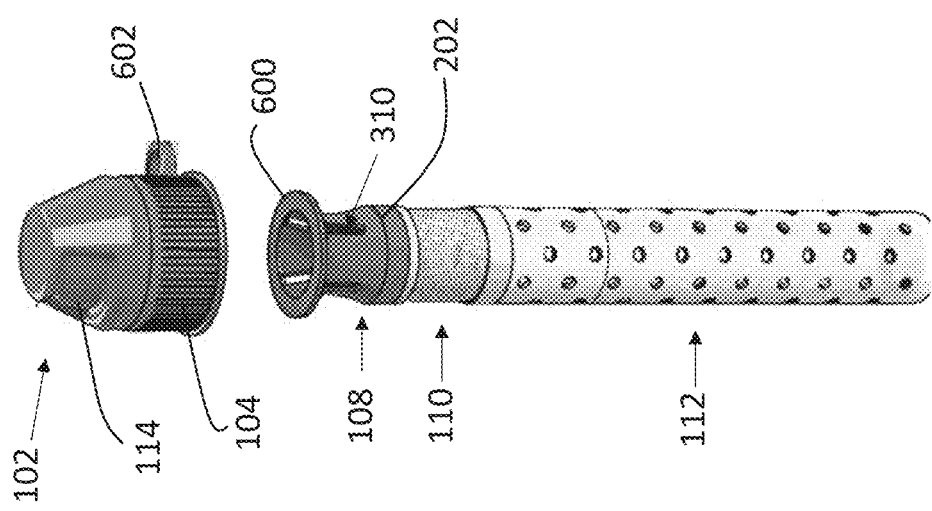
FIG. 6 is a perspective view of the cap subassembly, showing the flange at the upper end of the infused solution intake member, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient portable solvent infuser assembly for infusing a liquid in a drinking liquid dispenser, namely a conventional water bottle. Embodiments of the invention provide a portable solvent infuser assembly for a drinking liquid dispenser, hereafter "assembly" that quickly couples and uncouples to a conventional drinking liquid dispenser, yet effectively and efficiently permits infusion of a solute housed in the assembly within a solvent, e.g., water, within the drinking liquid dispenser.

In addition, embodiments of the invention provide, a fine infuser body subassembly and a coarse infuser body subassembly that are arranged axially, and interchangeable. The body subassemblies are adaptable to variously sized threaded connections to enable this interchangeability. A plurality of apertures defined the sidewalls of the fine and coarse infuser body subassemblies. The apertures enable passage of the drinkable solvent inside the drinking liquid dispenser to enter and egress the body cavity of the infuser body subassemblies.

In addition, embodiments of the invention provide a cap subassembly, which is coupled to the infuser body subassemblies. The cap assembly is configured to detachably attach to an opening of the drinking liquid dispenser. In this manner, the fine and coarse infuser body subassemblies are fully immersed in the cavity of the drinking liquid dispenser or water bottle. The cap subassembly has a concave curved shape to enable uniform flowage of the liquid through an infused solution intake member.

It should be understood that terms such as, "front," "rear," "side," top," "bottom," and the like are indicated from the reference point of a viewer viewing the portable solvent infuser assembly 100. As used herein, the term "wall" is intended broadly to encompass continuous structures, as well as, separate structures that are coupled together to form a substantially continuous external surface.

Referring now to FIG. 1, one embodiment of the present invention is shown in an exploded view. FIG. 1 shows several advantageous features of the present invention, but, as will be described below, the invention can be provided in several shapes, sizes, combinations of features and components, and varying numbers and functions of the components. The first example of a portable solvent infuser assembly 100 is shown in FIG. 1.

The invention described herein provides a drinking liquid dispenser infuser assembly 100 that overcomes known disadvantages of those known devices and methods of this general type and that effectively and efficiently is operable to removably couple with a top end of a drinking liquid dispenser 400. Although the invention is illustrated and described herein as embodied in a drinking liquid dispenser infuser assembly, it is, nevertheless, not intended to be limited to the details shown because various modifications and structural changes may be made therein without departing from the spirit of the invention.

Additionally, well-known elements of exemplary embodiments of the invention will not be described in detail or will be omitted so as not to obscure the relevant details of the invention.

It is to be understood that the disclosed embodiments herein are merely exemplary of the invention, which can be embodied in various forms. Therefore, specific structural and functional details disclosed herein are not to be interpreted as limiting, but merely as a basis for future claims and as a representative basis for teaching one of ordinary skill in the art to variously employ the present invention in virtually any appropriately detailed structure. Further, the terms and phrases used herein are not intended to be limiting; but rather, to provide an understandable description of the invention. It is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the infuser spanning from the bottom end to the top end, wherein "transverse" should be understood to mean a direction corresponding to a direction substantially opposite to the longitudinal direction.

The attached figures are incorporated in and form part of the specification, and serve to further illustrate various embodiments and explain various principles and advantages all in accordance with the present invention. Moreover, it is believed that the invention will be better understood from a consideration of the following description in conjunction with the drawing figures, in which like reference numerals are carried forward.

Referring now to FIG. 1, one embodiment of the present invention is shown in various views. FIG. 1, along with other figures, shows several advantageous features of the present invention, but, as will be described below, the invention can be provided in several shapes, sizes, combinations of features and components, and varying numbers and functions of the components.

The solvent infuser assembly 100 is used in combination with a conventional drinking liquid dispenser 400, as shown in FIG. 4. In some embodiments, the drinking liquid dispenser 400 may include a water bottle or other liquid solvent storage and dispensing container. Suitable materials for the drinking liquid dispenser 400 may include, without limitation, plastic, silicone, glass, aluminum, and rubber.

Continuing, the drinking liquid dispenser 400 is configured to contain a solvent 402 within a dispenser cavity 410. The solvent 402 may include, without limitation, water, a sports drink, a juice, a soda, milk, yogurt, and a rehydrating fluid known in the art. The drinking liquid dispenser 400 may be elongated, cylindrical, and have an upper threaded end 404 with an upper terminal end 406. The upper terminal end 406 defines an upper terminal opening 408 in fluid communication with the dispenser cavity. The upper terminal end 406 also supports the assembly 100 by providing a fastenable surface for seating the cap subassembly 102, described below.

In one embodiment of the present invention, an infuser body includes the sections removably couplable to one another to provide, for example, user access to the infusion cavity—a cap subassembly 102, a fine infuser body subassembly 110, and a coarse infuser body subassembly 112. In other embodiments, the three sections may be of a unitary configuration or may be less/more than three sections. The sections may be coupled together using friction fitting or one or more fasteners. In the unitary configuration, access to the infusion cavity may be provided through one or more access doors. The sections may also be cylindrical or have another shape.

Thus, one significant benefit of the present invention is that the infusion assembly 100 can be adapted to couple with any conventionally sized drinking liquid dispenser, thereby providing an assembly 100 that can be utilized to infuse a conventional or standard-sized drinking liquid dispenser 400.

Turning now to FIG. 2, the assembly 100 includes a cap subassembly 102 that forms the gateway for accessing the solvent, or drinking liquid, that is contained in the cavity of the drinking liquid dispenser 400. The cap subassembly 102 is configured to detachably attach to the upper threaded end 404 of the drinking liquid dispenser 400, and pivotally follow a cap translation path 800 about a hinge 208 to selectively encapsulate and disengage from the cap subassembly 102. This manipulation of the cap subassembly 102 creates a selective path of restriction or free flowage for the infused beverage in the drinkable liquid dispenser 400.

As FIG. 3 illustrates, the cap subassembly 102 comprises an inner wall 300, and an outer sidewall 104 having a lower end 200. The cap subassembly 102 also comprises an inner surface 302 with a threaded configuration 304 disposed thereon. The outer sidewall 104 is operably configured to engage with the upper threaded end 404 of the drinking liquid dispenser 400. The outer sidewall 104 of the cap subassembly 102 defines an enclosed cap cavity 306.

In some embodiments, the cap subassembly 102 further includes a spout 106 that is coupled to the inner wall of the cap subassembly 102. The spout 106 defines an enclosed cap channel 318. In one non-limiting embodiment, the spout 106 has a curved, conical shape, terminating at an outlet hole that enables passage of the infused drinking liquid from the drinking liquid dispenser 400.

In some embodiments, the cap subassembly 102 further comprises a cap 114. The cap 114 is hingedly joined to the outer sidewall of the cap subassembly 102 at a hinge 208. The cap 114 is selectively removably coupled to the cap subassembly 102. The cap 114 has closed position along a cap translation path 800 that, with the inner wall 300 of the cap subassembly 102, encapsulates the spout 106 of the cap subassembly 102.

In another embodiment, the cap 114 holds the cap subassembly 102 and connected fine and coarse infuser body subassemblies 110, 112 within the internal chamber of the drinking liquid dispenser 400 after it is coupled to the threaded end 404 of the drinking liquid dispenser 400. The top end of the cap subassembly 102 may define an upper aperture permitting the filtered infused beverage to reach the infused beverage channels of the cap 114.

Further, the cap subassembly 102 includes an infused solution intake member 108 spanning from the spout. The infused solution intake member 108 extends past the lower end of the outer sidewall, and into the dispenser cavity. The sidewall 316 of the infused solution intake member 108 has a concave curved shape with respect to the inner surface of the outer sidewall 104 of the cap subassembly 102.

Figure 5:
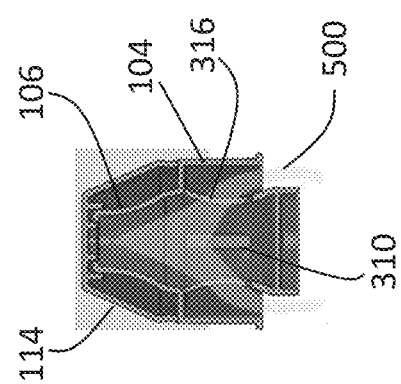
FIG. 5 is a sectioned side view of the cap subassembly, showing flowage through the concave infused solution intake member, in accordance with the present invention.

As illustrated in FIG. 5, the curved configuration of the sidewall 316 infused solution intake member 108 allows the drinking liquid 500 to flow uniformly from the upper threaded end of the drinking liquid dispenser 400, through the cap subassembly 102. The infused solution intake member 108 also serves as a filter for larger particles that disengage from the solute.

In some embodiments, the infused solution intake member 108 may have an intake member upper end 206 that is defined by an upper aperture 308, and defining an infused solution intake channel 310 fluidly coupled to the upper aperture of the infused solution intake member 108. The infused solution intake member 108 also has an intake member lower end 202 with a threaded configuration 312 defined thereon.

The infused solution intake member 108 further comprises a sidewall 316 separating the intake member upper and lower ends 206, 202. The sidewall 316 defines a plurality of infusion apertures 204*a*-*n* thereon through which the infused drinking liquid flows. The infused solution intake member 108 further comprises an intake member lower wall 314 interposed between the lower end 202 of the infused solution intake member 108 and the infused solution intake channel 310.

In some embodiments, the infused solution intake member 108 may include a flange 600 at the intake member upper end 206 (FIG. 6). The flange 600 seats on the upper threaded end of the drinking liquid dispenser 400, forming a stable mounting surface on the upper threaded end of the drinking liquid dispenser for the cap subassembly 102 to position. In this manner, the fine and coarse infuser body subassemblies 110, 112 are immersed in the dispenser cavity of the drinkable liquid dispenser 400.

Looking again at FIG. 1, the assembly 100 comprises a dispenser adapter member 126 that has an annular shape. The dispenser adapter member 126 has an upper end 144 with a threaded configuration disposed thereon. The upper end 144 is operably configured to engage with the threaded configuration on the inner surface 302 of the outer sidewall 104 of the cap subassembly 102.

The dispenser adapter 126 also has a lower end 146 with a threaded configuration disposed thereon. The lower end 146 is operably configured to engage with the threaded configuration on the upper threaded end 404 of the drinking liquid dispenser 400. The threaded configuration disposed on the lower end 146 of the dispenser adapter 126 is of an annular diameter less than an annular diameter of the threaded configuration disposed on the upper end 144 of the dispenser adapter 126.

Looking now at FIG. 8, the assembly 100 further includes a fine infuser body subassembly 110 that contains and infuses a solute, and particularly a small solute, into the solvent of the liquid drinking dispenser 400. The fine infuser body subassembly 110 may be filled with a small solute, such as a powder, for infusion into the solute through a plurality of fine infuser body apertures 122*a*-*n*. The fine infuser body subassembly 110 may also include a dry compartment for storing powder or supplements, wherein the dry compartment may be operable to release the powder or supplements in the liquid of the drinking liquid dispenser in which the fine infuser body subassembly is housed.

Further, the fine infuser body sub-assembly 110 has an upper end 128 with a threaded configuration disposed thereon. The upper end 128 is operably configured to engage with the threaded configuration disposed on the lower end 202 of the infused solution intake member 108. In this manner, the fine infuser body subassembly 110 can be rotatably coupled and decoupled with the cap subassembly 102.

The fine infuser body subassembly 110 also has a lower end 130 that opposes the upper end 128. A sidewall 116 separates the upper and lower ends 128, 130 of the first infuser body sub-assembly 110. The sidewall 116 is defined by a plurality of fine infuser body apertures 122*a*-*n*. The sidewall 116 is also defined by a fine infuser body cavity 138 sized to house a solute therein. The fine infuser body subassembly 110 is operable in the dispenser cavity of the drinking liquid dispenser.

Specifically, the fine infuser body subassembly 110, which may be composed of a polymeric or metallic material, includes an enclosed sidewall defining a body cavity sized to house, e.g., a perishable food item such as strawberries or cucumber, and defining a plurality of fine apertures 122*a*-*n* disposed along its longitudinal length. The fine apertures 122*a*-*n* or mesh screen defined by the sidewall 116 of the fine infuser body subassembly 110 permits liquid within the water to enter the fine infuser body cavity 138 and infuse the solute, thereby creating an infused beverage.

Figure 11:
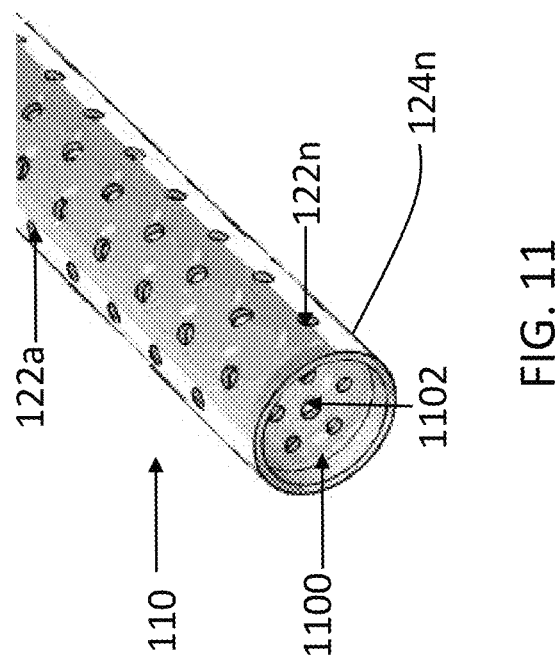
FIG. 11 is a perspective view of a bottom wall and bottom aperture in the fine infuser body subassembly, in accordance with the present invention.

Additionally, as shown in FIG. 11, one or more bottom apertures 1102 may also be defined on a bottom wall 1100 of the fine infuser body subassembly 110. The bottom apertures 1102 facilitate in permitting water or other liquid inside a drinking liquid dispenser or container to enter and egress the body cavity of the fine infuser body subassembly 110.

In some embodiments, a selectively removable fine cover 114 is used to restrict flowage of solutes and solvent directly between at least one of the lower and upper ends 128, 130 of the fine infuser body sub-assembly 110. As shown in FIG. 1, the selectively removable fine cover 114 defines the upper end 130 of the fine infuser body subassembly 110 and is selectively removable to the fine infuser body subassembly 110 with a threaded configuration 142. The fine cover 114 couples to at least one of the upper and lower ends 128, 130 of the first or fine infuser body sub-assembly 110.

Specifically, the fine cover 114 restricts passage of solute and solvent between the fine infuser body subassembly 110, the fine infuser body subassembly 110, and the infused solution intake member 108. The fine cover 114 may be threaded to couple and decouple easily. Thus, the fine cover 114 can be selectively used with the assembly 100.

The fine infuser body subassembly 110 is also unique in that the fine apertures serve as a filter for restricting passage of larger solvents, such as pulp and seeds, into the infused solution intake member 108 at the cap subassembly 102. In one embodiment, the fine infuser body assembly 100 serves as a water filtering section disposed above the infusion cavity, wherein a substantially enclosed partition or bottom wall of the water filtering section separates the water filtering section from the fine infuser body cavity 138. This helps to prevent larger portions of fruit, seeds, or other portions of the solute housed in the infusion chamber and drinking liquid dispenser from entering one or more infused beverage discharge channels for emission to the user.

In another embodiment of the present invention, the assembly 100 includes a coarse infuser body subassembly 112 that is operable in the dispenser cavity of the drinking liquid dispenser 400. The coarse infuser body subassembly 112 is axially arranged with the fine infuser body subassembly 110, such that the fine infuser body subassembly 110 is more proximal to the cap subassembly 102 than is the coarse infuser body subassembly 112.

The fine infuser body subassembly 110 and the coarse infuser body subassembly 112 detachably attach in an axial relationship. To this end, the threaded configurations of the upper and lower ends 128, 130 of the fine infuser body assembly 100, the upper and lower ends 132, 134 of the coarse infuser body subassembly 112, and the lower end 200 of the cap subassembly 102 are substantially the same size.

For example, FIGS. 10A and 10B show views of the assembly 100, where FIG. 10A shows the coarse infuser body subassembly 112 arranged above the fine infuser body subassembly 110; and FIG. 10B shows the fine infuser body subassembly 110 arranged above the coarse infuser body subassembly 112. Since the threads on both ends are substantially the same, this interchangeability is possible. Also, the threads are sized to accommodate Type A, B, and C threads of dispensers known in the art.

Thus, a unique synergy is created when infusing solutes into the solvent, i.e., drinking liquid, in the drinking liquid dispenser, as both can be filled with a desired solute that infuses into the solvent through the respective apertures 122a-n, 124a-n, 1102.

In some embodiments, the length of the fine infuser body subassembly 110 and the coarse infuser body subassembly 112, spanning from the terminal top end to the terminal bottom end, is less than the longitudinal length of the drinking liquid dispenser 400, from the bottom end to the distal end of the drinkable liquid dispenser 400 defining the distal aperture where liquid in the dispenser 400 leaves, and approximately greater than 75% of the longitudinal length of the dispenser 400. In other embodiments, the infuser body subassemblies 110, 112 are of another length.

The distal end of the fine and coarse infuser body subassemblies 110, 112 may include a flange 600 along the longitudinal length of the infuser body subassemblies for preventing the body from being further inserted into the drinking liquid dispenser, thereby disposing all or a portion of the body in the drinking liquid dispenser for infusion. As such, in one embodiment, the flange 600, which may continuously or discontinuously surround the sidewall of the infuser body subassemblies 110, 112, may be disposed at a terminal end of the infuser body subassemblies. This allows for sufficient length for a liquid emission cap. In other embodiments, it may be disposed along another portion of the infuser length. In yet other embodiments, the flange 600 radially extends from the intake member upper end 206 of the infused solution intake member 108.

For example, a conventional 12 oz. drinking liquid dispenser may be 7" tall and generally have a 2.25" diameter, with the opening of the water bottom having a diameter of approximately 1". As such, the combined fine and coarse infuser body subassemblies 110, 112 may be 6" in length and have a diameter of 1", wherein the flange 600 at the cap subassembly 102 may have a diameter of approximately 1.1" so that it seats on top of the upper threaded end of the drinking liquid dispenser.

The coarse infuser body subassembly 112 has an upper end with a threaded configuration disposed thereon. The coarse infuser body is operably configured to engage with the threaded configuration disposed on the lower end 202 of the infused solution intake member 108. A lower end opposing the upper end of the fine infuser body subassembly 110 is operably configured to engage with the threaded configuration 142 disposed on the fine infuser body subassembly 110. Thus, the upper end 132 of the coarse infuser body subassembly 112 with the threaded configuration 136 is operably configured to engage with the threaded configuration disposed on the lower end 130 of the fine infuser body subassembly 110.

In some embodiments, the coarse infuser body subassembly 112 has a sidewall 120 that separates the upper and lower ends 132, 134 of the coarse infuser body sub-assembly 112. The sidewall is defined by a plurality of coarse infuser body apertures 124a-n thereon. The sidewall 120 is also defined by a plurality of infuser coarse body apertures 124a-n. The coarse body apertures 124a-n permit liquid within the water to enter the coarse infuser body cavity 140 and infuse the solute, thereby creating an infused beverage. The coarse infuser body apertures 124a-n are uniformly greater in diameter than respective diameters of the fine infuser body apertures 122a-n. The sidewall 120 is also defined by a coarse infuser body cavity 140 sized to house a solute therein.

Said another way, the fine and coarse infusion body subassemblies 110, 112 may include two differently sized apertures 122a-n, 124a-n along its length, i.e., one larger sized aperture, e.g., approximately 0.1-4", for adequately permitting water or another solvent to effectively enter and leave the infusion cavity for reaching the solute to generate the infused beverage, and another smaller aperture, e.g., approximately 0.02-0.2", for permitting the infused beverage to enter the infused beverage discharge channels and aperture of the cap subassembly 102. In other embodiments, other sizes for the apertures may vary, including the apertures being of the same size.

As such, in one exemplary method of use, the fine and coarse infuser body subassemblies 110, 112 are opened so a solute material, e.g., a perishable food item, is inserted therein. In one embodiment, the infusion cavity is exposed by disconnecting sections of the fine and coarse infuser body subassemblies 110, 112 and coupled together when desired for use. The fine and coarse infuser body subassemblies 110, 112 are inserted into the drinking liquid dispenser until a bottom surface of the flange 600 reaches the top surface of the drinking liquid dispenser and the bottom end and longitudinal length of the fine and coarse infuser body subassemblies 110, 112 is within the chamber of the drinking liquid dispenser. In other embodiments, the fine and coarse infuser body subassemblies 110, 112 may float within the internal chamber of the drinking liquid dispenser.

Thereafter, when desired for use, the infused beverage is operable to flow through one or more infused beverage discharge channels defined by the cap subassembly 102 (i.e., channels disposed above a section defined by the infuser body subassemblies and the sidewall of the drinking liquid dispenser defining the opening) and/or the filtering section. The infused beverage flow is generated by the weight of the liquid against the infused beverage discharge channels through vertical orientation of the drinking liquid dispenser and/or suction created by the user.

In another example of the portable capacity of the assembly 100, FIG. 7 illustrates a travel tube 700 or container sized and shaped to house the fine and coarse infusion body subassemblies when not in use. The travel tube 700 may include a rigid, cylindrical container fabricated from materials, such as plastic, aluminum, and glass. A travel tube cap 900 prevents debris from entering the cap subassembly 102 and the fine and coarse infuser body subassemblies 110, 112 (FIG. 9).

In some embodiments, a selectively removable coarse cover 118 is used to restrict flowage of solutes and solvent directly between at least one of the lower and upper ends of the infuser body subassemblies. The coarse cover 118 couples to at least one of the upper and lower ends of the coarse infuser body subassembly 112. Specifically, the coarse cover 118 restricts passage of solute and solvent between the fine infuser body subassembly 110, the coarse infuser body subassembly 112, and the infused solution intake member 108. The coarse cover 118 may be threaded to couple and decouple easily. Thus, the coarse cover 118 can be selectively used with the assembly 100.

Figure 13:
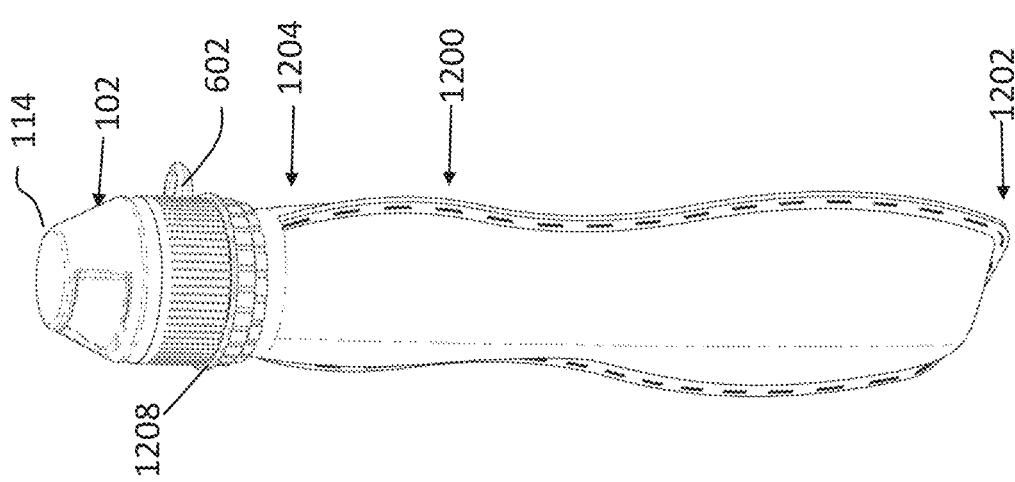
FIG. 13 is a perspective view of the resilient storage case shown in FIG. 12 encapsulating the assembly, in accordance with the present invention.
Figure 12:
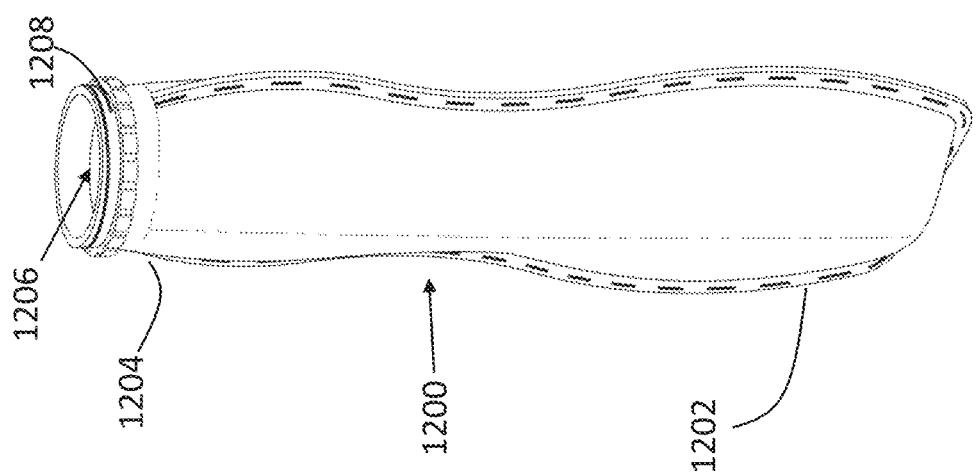
FIG. 12 is a perspective view of an exemplary resilient storage case in an upright position, in accordance with the present invention.

Looking now at FIGS. 12 and 13, the assembly comprises a resilient storage case 1200 that receives and encapsulates the fine infuser body subassembly 110 and the coarse infuser body subassembly 112. The storage case defined by a bottom end 1202 and a top end 1204 forming a case opening 1206 that aligns with the cap subassembly 102. A storage case adapter 1208 is configured to couple with the threaded configuration 304 of the cap assembly 102. In one embodiment, the storage case 1200 is of a flexible and deformable resilient polymeric material, such as neoprene. In other embodiments, the storage case 1200 is of another polymeric-based material.

Figure 14:
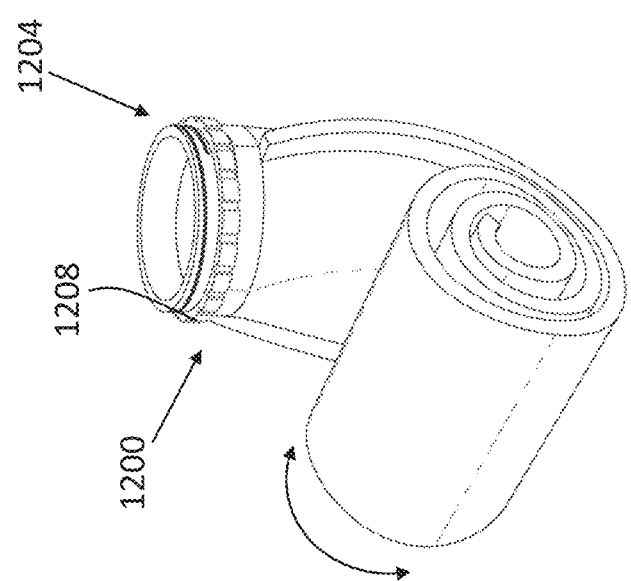
FIG. 14 is a perspective view of the resilient storage case shown in FIG. 12 empty and rolled up for stowage, in accordance with the present invention.

In one non-limiting embodiment, the storage case 1200 is defined by an elongated, cylindrical shape, similar to the cylindrically shaped fine and coarse infuser body subassemblies 110, 112, so as to receive and encapsulate the entire assembly 100 (FIG. 13). This creates a protective barrier and a surface for gripping the assembly 100 during transport. The storage case 1200 is sufficiently resilient to roll up when not covering the assembly 100 (FIG. 14).

Looking now at FIG. 15, the assembly comprises a mount ring 602 that fixedly attaches to the outer sidewall 104 of the cap subassembly 102. The mount ring 602 forms a mounting means to hang the assembly on a mounting surface 1600. For example, FIG. 16 shows the assembly hanging from a backpack, as the mount ring 602 hangs from a mounting surface 1600, such as a backpack, while encased in the storage case 1200. In this manner, the mount ring 602 creates a unique tethering mechanism that enhances the portability of the assembly 100.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. In combination with a conventional plastic drinking liquid dispenser enclosing a solvent within a dispenser cavity and having an upper threaded end with an upper terminal end defining an upper terminal opening in fluid communication with the dispenser cavity, the improvement comprising:
   a solvent infuser assembly having:
   a cap subassembly defined by:
      an inner wall;
      an outer sidewall having a lower end and an inner surface with a threaded configuration disposed thereon and operably configured to engage with the upper threaded end of the drinking liquid dispenser, the outer sidewall of the cap subassembly defining an enclosed cap cavity;
      a spout coupled to the inner wall of the cap subassembly and defining an enclosed cap channel; and
      an infused solution intake member spanning from the spout, the infused solution intake member extending past the lower end of the outer sidewall, and into the dispenser cavity, the infused solution intake member having an intake member upper end defining an upper aperture, defining an infused solution intake channel fluidly coupled to the upper aperture of the infused solution intake member, an intake member lower end with a threaded configuration defined thereon, and a sidewall separating the intake member upper and lower ends and defining a plurality of infusion apertures thereon; and
   a fine infuser body subassembly having an upper end with a threaded configuration disposed thereon and operably configured to engage with the threaded configuration disposed on the lower end of the infused solution intake member, a lower end opposing the upper end of the fine infuser body subassembly, and a sidewall separating the upper and lower ends of the fine infuser body subassembly, defining a plurality of fine infuser body apertures thereon, and defining a fine infuser body cavity sized to house a solute therein, the fine infuser body subassembly disposed in the dispenser cavity; and
   a selectively removable fine cover coupled to at least one of the upper and lower ends of the fine infuser body subassembly.

2. The improvement according to claim 1, wherein the sidewall of the infused solution intake member has a concave curved shape with respect to the inner surface of the outer sidewall of the cap subassembly.

3. The improvement according to claim 1, wherein the infused solution intake member further comprises:
   an intake member lower wall interposed between the lower end of the infused solution intake member and the infused solution intake channel.

4. The improvement according to claim 1, wherein the cap subassembly further comprises:
   a cap selectively removably coupled to the cap subassembly and having a closed position along a cap translation path that, with the inner wall of the cap subassembly, encapsulate the spout of the cap subassembly.

5. The improvement according to claim 1, wherein:
   the cap is hingedly joined to the outer sidewall of the cap subassembly at a hinge.

6. The improvement according to claim 1, wherein:
the selectively removable fine cover of the fine infuser body subassembly defines the upper end of the fine infuser body subassembly and is selectively removable to the fine infuser body subassembly with a threaded configuration.

7. The improvement according to claim 1, wherein the solvent infuser assembly further comprises:
a coarse infuser body subassembly having an upper end with a threaded configuration disposed thereon and operably configured to engage with the threaded configuration disposed on the lower end of the infused solution intake member, a lower end opposing the upper end of the coarse infuser body subassembly, and a sidewall separating the upper and lower ends of the coarse infuser body subassembly, defining a plurality of coarse infuser body apertures thereon, and defining a coarse infuser body cavity sized to house a solute therein, the coarse infuser body subassembly disposed in the dispenser cavity; and
a selectively removable coarse cover coupled to at least one of the upper and lower ends of the coarse infuser body subassembly.

8. The improvement according to claim 7, wherein:
the fine cover and the coarse cover restrict fluid communication between the fine infuser body subassembly, the coarse infuser body subassembly, and the infused solution intake member.

9. The improvement according to claim 7, wherein the lower end of the fine infuser body subassembly further comprises:
a threaded configuration disposed thereon, wherein the upper end of the coarse infuser body with the threaded configuration is operably configured to engage with the threaded configuration disposed on the lower end of the fine infuser body subassembly.

10. The improvement according to claim 7, wherein:
the plurality of coarse infuser body apertures are uniformly greater in diameter than respective diameters of the plurality of fine infuser body apertures.

11. The improvement according to claim 1, wherein the solvent infuser assembly further comprises:
a dispenser adapter member of an annular shape, having an upper end with a threaded configuration disposed thereon operably configured to engage with the threaded configuration on the inner surface of the outer sidewall of the cap subassembly, and having a lower end with a threaded configuration disposed thereon operably configured to engage with the threaded configuration on the upper threaded end of the drinking liquid dispenser, wherein the threaded configuration disposed on the lower end of the dispenser adapter is of an annular diameter less than an annular diameter of the threaded configuration disposed on the upper end of the dispenser adapter.

12. The improvement according to claim 1, wherein:
the threaded configurations of the upper and lower ends of the fine infuser body assembly, the upper and lower ends of the coarse infuser body assembly, and the lower end of the cap subassembly are substantially the same size.

13. The improvement according to claim 1, wherein:
the infused solution intake member further comprises a flange at the intake member upper end.

14. The improvement according to claim 13, wherein:
the flange seats on the upper threaded end of the drinking liquid dispenser.

15. The improvement according to claim 1, wherein the solvent infuser assembly further comprises:
a storage case encapsulating the fine infuser body subassembly and the coarse infuser body subassembly, the storage case defined by a bottom end and a top end forming a case opening that aligns with the cap subassembly, the top end comprising a storage case adapter.

16. The improvement according to claim 1, wherein the cap subassembly further comprises:
a mount ring.

17. The improvement according to claim 1, wherein the cap subassembly further comprises:
a travel tube and a travel cap sized and shaped to house the fine and coarse infusion body subassemblies.

18. In combination with a conventional plastic water bottle enclosing a solvent within a dispenser cavity and having an upper threaded end with an upper terminal end defining an upper terminal opening in fluid communication with the dispenser cavity, the improvement comprising:
a cap subassembly defined by:
an inner wall;
an outer sidewall having a lower end and an inner surface with a threaded configuration disposed thereon and operably configured to engage with the upper threaded end of the water bottle, the outer sidewall of the cap subassembly defining an enclosed cap cavity;
a spout coupled to the inner wall of the cap subassembly and defining an enclosed cap channel;
a cap selectively removably coupled to the cap subassembly and having a closed position along a cap translation path that, with the inner wall of the cap subassembly, encapsulate the spout of the cap subassembly, the cap further being hingedly connected to the outer sidewall of the cap subassembly; and
an infused solution intake member spanning from the spout, the infused solution intake member extending past the lower end of the outer sidewall, and into the dispenser cavity, the infused solution intake member defined by a flange and an upper end defining an upper aperture, defining an infused solution intake channel fluidly coupled to the upper aperture of the infused solution intake member, a lower end with a threaded configuration defined thereon, and a sidewall separating the upper and lower ends of the infused solution intake member and defining a plurality of infusion apertures thereon;
a mount ring joined to the outer sidewall of the cap subassembly;
a fine infuser body assembly having an upper end with a threaded configuration disposed thereon and operably configured to engage with the threaded configuration disposed on the lower end of the infused solution intake member, a lower end opposing the upper end of the fine infuser body subassembly, and a sidewall separating the upper and lower ends of the fine infuser body subassembly, the sidewall defining a plurality of fine infuser body apertures thereon, the sidewall having a bottom wall defining one or more bottom apertures, the sidewall further defining a fine infuser body cavity sized to house a solute therein, the fine infuser body subassembly disposed in the dispenser cavity;
a selectively removable fine cover coupled to at least one of the upper and lower ends of the fine infuser body subassembly;

a coarse infuser body subassembly having an upper end with a threaded configuration disposed thereon and operably configured to engage with the threaded configuration disposed on the lower end of the infused solution intake member, a lower end opposing the upper end of the coarse infuser body subassembly, and a sidewall separating the upper and lower ends of the coarse infuser body subassembly, defining a plurality of coarse infuser body apertures thereon, and defining a coarse infuser body cavity sized to house a solute therein, the coarse infuser body subassembly disposed in the dispenser cavity;

a selectively removable coarse cover coupled to at least one of the upper and lower ends of the coarse infuser body subassembly, whereby the fine cover and the coarse cover restrict fluid communication between the fine infuser body subassembly, the coarse infuser body subassembly, and the infused solution intake member, whereby the plurality of coarse infuser body apertures are uniformly greater in diameter than respective diameters of the plurality of fine infuser body apertures; and a dispenser adapter member of an annular shape, having an upper end with a threaded configuration disposed thereon operably configured to engage with the threaded configuration on the inner surface of the outer sidewall of the cap subassembly, and having a lower end with a threaded configuration disposed thereon operably configured to engage with the threaded configuration on the upper threaded end of the water bottle, whereby the threaded configuration disposed on the lower end of the dispenser adapter is of an annular diameter less than an annular diameter of the threaded configuration disposed on the upper end of the dispenser adapter.

19. The improvement according to claim 18, wherein:
the threaded configurations of the upper and lower ends of the fine infuser body assembly, the upper and lower ends of the coarse infuser body assembly, and the lower end of the cap subassembly are substantially the same size.

20. A solvent infuser assembly, comprising:
a cap subassembly defined by:
an inner wall;
an outer sidewall having a lower end and an inner surface with a threaded configuration disposed thereon, the outer sidewall of the cap subassembly defining an enclosed cap cavity;
a spout coupled to the inner wall of the cap subassembly and defining an enclosed cap channel;
a cap selectively removably coupled to the cap subassembly and having a closed position along a cap translation path that, with the inner wall of the cap subassembly, encapsulate the spout of the cap subassembly, the cap further being hingedly connected to the outer sidewall of the cap subassembly; and
an infused solution intake member spanning from the spout, the infused solution intake member extending past the lower end of the outer sidewall, the infused solution intake member defined by a flange and an upper end defining an upper aperture, defining an infused solution intake channel fluidly coupled to the upper aperture of the infused solution intake member, a lower end with a threaded configuration defined thereon, and a sidewall separating the upper and lower ends of the infused solution intake member and defining a plurality of infusion apertures thereon;

a mount ring joined to the outer sidewall of the cap subassembly;

a fine infuser body assembly having an upper end with a threaded configuration disposed thereon and operably configured to engage with the threaded configuration disposed on the lower end of the infused solution intake member, a lower end opposing the upper end of the fine infuser body subassembly, and a sidewall separating the upper and lower ends of the fine infuser body subassembly, defining a plurality of fine infuser body apertures thereon, and defining a fine infuser body cavity;

a selectively removable fine cover coupled to at least one of the upper and lower ends of the fine infuser body subassembly;

a coarse infuser body subassembly having an upper end with a threaded configuration disposed thereon and operably configured to engage with the threaded configuration disposed on the lower end of the infused solution intake member, a lower end opposing the upper end of the coarse infuser body subassembly, and a sidewall separating the upper and lower ends of the coarse infuser body subassembly, defining a plurality of coarse infuser body apertures thereon, and defining a coarse infuser body cavity;

a selectively removable coarse cover coupled to at least one of the upper and lower ends of the coarse infuser body subassembly, whereby the fine cover and the coarse cover restrict fluid communication between the fine infuser body subassembly, the coarse infuser body subassembly, and the infused solution intake member, whereby the plurality of coarse infuser body apertures are uniformly greater in diameter than respective diameters of the plurality of fine infuser body apertures; and a dispenser adapter member of an annular shape, having an upper end with a threaded configuration disposed thereon operably configured to engage with the threaded configuration on the inner surface of the outer sidewall of the cap subassembly.

\* \* \* \* \*